(12) United States Patent
Ingleson

(10) Patent No.: US 10,843,717 B2
(45) Date of Patent: Nov. 24, 2020

(54) TRAILER DOLLY

(71) Applicant: Greg Ingleson, Vaughan (CA)

(72) Inventor: Greg Ingleson, Vaughan (CA)

(*) Notice: Subject to any disclaimer, the term of this patent is extended or adjusted under 35 U.S.C. 154(b) by 0 days.

(21) Appl. No.: 16/180,293

(22) Filed: Nov. 5, 2018

(65) Prior Publication Data
US 2020/0239052 A1 Jul. 30, 2020

(51) Int. Cl.
*B62B 1/04* (2006.01)
*B62B 5/00* (2006.01)
*B62B 1/06* (2006.01)

(52) U.S. Cl.
CPC ............. *B62B 1/04* (2013.01); *B62B 5/0079* (2013.01); *B62B 1/06* (2013.01); *B62B 2206/06* (2013.01)

(58) Field of Classification Search
CPC ........... B62B 1/04; B62B 1/06; B62B 5/0079; B62B 2206/06
See application file for complete search history.

(56) References Cited

U.S. PATENT DOCUMENTS

| | | | |
|---|---|---|---|
| 2009/0028679 A1* | 1/2009 | Smith | B60R 9/06 414/462 |
| 2010/0066069 A1* | 3/2010 | Bradshaw | B60R 9/06 280/769 |
| 2017/0341556 A1* | 11/2017 | Peles | B62B 5/066 |
| 2019/0232992 A1* | 8/2019 | Bondaryk | B62B 5/0033 |

* cited by examiner

Primary Examiner — Bryan A Evans
(74) Attorney, Agent, or Firm — Elias Borges

(57) ABSTRACT

Herein is disclosed a dolly for carrying a heavy object by means of a car with a trailer hitch. The dolly includes a rigid frame adapted to securely hold an object on a front face of the rigid frame. Left and right parallel pneumatic wheels are positioned on a left and right sides the rigid frame, respectively and extending perpendicularly away from the rigid frame opposite a platform. Each of the pneumatic wheels is highway rated. Each of the pneumatic wheels has a hub rotatably mounted to the rigid frame by a flange member projecting perpendicularly from the rigid frame, the flange members positioning the hubs away from the rigid frame such that the hubs are at least several inches from a back face of the rigid frame. The dolly also includes a retractable boom having a trailer hitch coupling on a distal end. The retractable boom is selectively movable between a retracted and extended position. Finally, the dolly includes a lock for releasably locking the retractable boom in its extended position.

8 Claims, 6 Drawing Sheets

TRAILER DOLLY

FIELD OF THE INVENTION

The invention relates generally to dollies for transporting heavy or bulky objects by hand.

BACKGROUND OF THE INVENTION

Transporting heavy and/or bulky objects by hand can be difficult, so dollies are usually employed to make the task easier. The dolly generally consists of a rigid frame having one or more pairs of wheels. A handle is usually provided on the dolly to make the dolly easier to push around. A flat platform is usually provided at one end of the dolly adjacent the wheels to permit the user to rest a heavy object on the platform and then pivot the dolly such that the heavy object is from the floor and may be transported on the dolly. While dollies of this type are useful, they still require the heavy object to be offloaded from the dolly and onto a vehicle if the object is to be transported a significant distance. This involves considerable effort, particularly if the vehicle platform on which the object is to be placed is high off the ground. It is possible to load the entire dolly onto the vehicle; however, this will require either a ramp to wheel the dolly onto the vehicle via the ramp, or several people to lift the dolly onto the vehicle. An improved dolly which makes the dolly easy to load onto a vehicle is therefore required.

SUMMARY OF THE INVENTION

In accordance with one aspect of the present invention, there is provided a dolly for carrying a heavy object by means of a car with a trailer hitch. The dolly includes a rigid elongated frame having a width, a length defined by opposite first and second ends, a front face and a back face, and opposite left and right sides, a platform extending perpendicularly from the rigid frame on the front face at the first end. The left and right parallel pneumatic wheels being positioned on the left and right sides the rigid frame, respectively and extending perpendicularly away from the rigid frame opposite the platform. Each of the pneumatic wheels is highway rated and has a diameter of at least 12". For the purposes of this document, "highway rated" means that the pneumatic wheels consist of a pneumatic tire mounted on a wheel hub, with the pneumatic tire being configured to safely endure being ridden over a roadway at highway speeds of 100 km/hr or greater. For greater clarity, highway rated pneumatic tires may incorporate fiberglass or steel belts for increased safety and durability. They will also be pressurized to beyond atmospheric pressure, usually greater than 30 psi. Each of the pneumatic wheels have a hub rotatably mounted to the rigid frame by a flange member projecting perpendicularly from the rigid frame, the flange members positioning the hubs away from the rigid frame such that the hubs are at least 5" from the back face of the rigid frame and the left and right pneumatic wheels extend at least 2" away from the left and right sides of the rigid frame, respectively. The dolly further includes a pair of handles positioned on the rigid frame adjacent the second end, the pair of handles projecting from the back face of the rigid frame. The dolly also includes a retractable boom positioned on the back face of the rigid frame equidistant from the left and right sides, the retractable boom having a distal end, a trailer hitch coupling being formed on the distal end, the retractable boom being selectively movable between a retracted position wherein the distal end is positioned between the first and second ends of the rigid frame, and an extended position wherein the distal end projects beyond the second end of the rigid frame. Finally, the dolly includes a lock for releasably locking the retractable boom in its extended position such that the boom is rigidly immovable relative to the rigid frame.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 1:
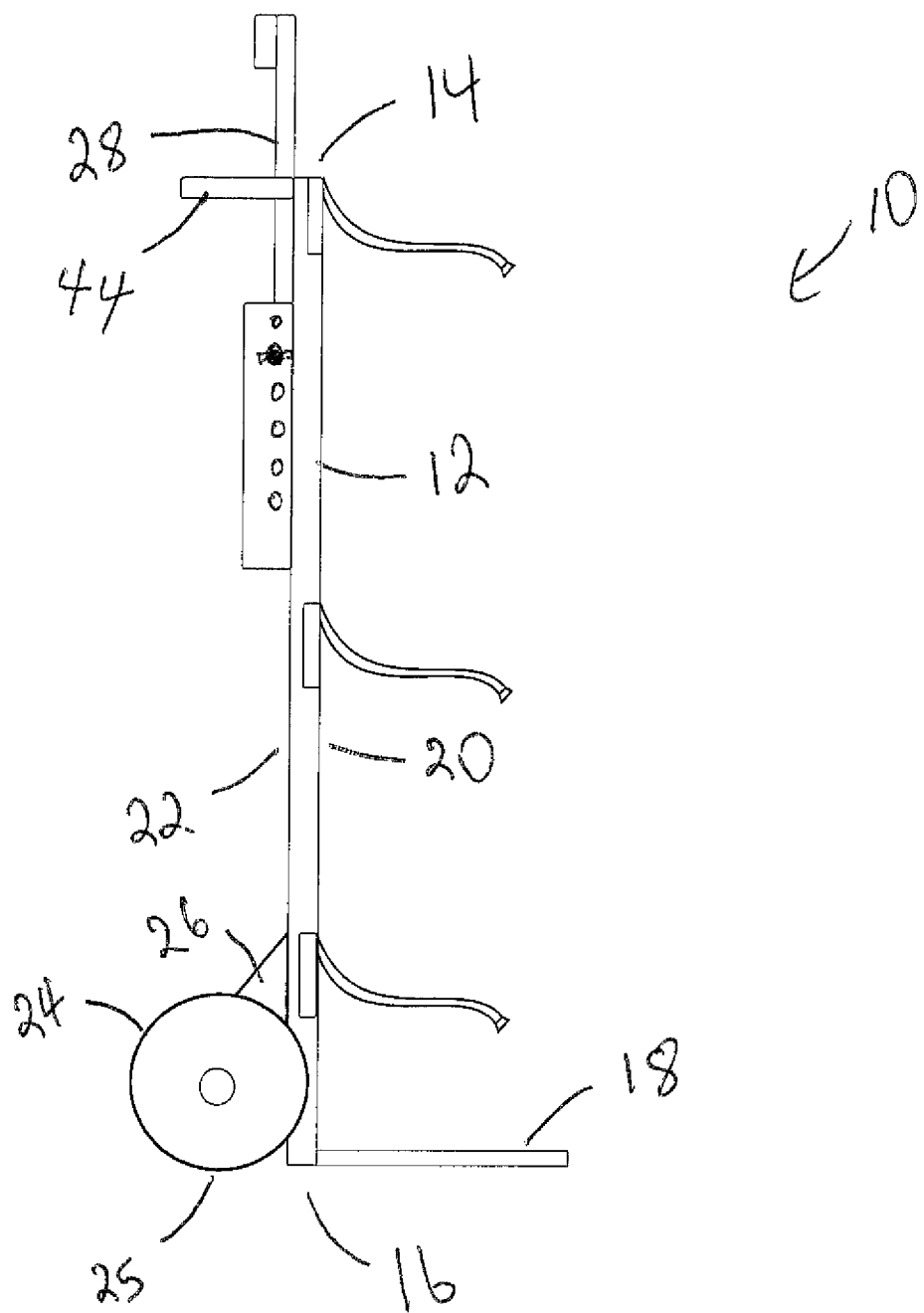
FIG. 1 is a side view of a dolly made in accordance with the present invention.

Referring to FIG. 1, the dolly made in accordance with the present invention is shown generally as item 10 and includes a rigid frame 12 having opposite ends 14 and 16 and opposite front side 20 and back side 22. A platform 18 projects perpendicularly from side 20 at end 16. A pair of wheels 24 are mounted to backside 22 of frame 12 adjacent end 16 such that the bottom surface 25 of wheels are more or less parallel to platform 18 permitting the dolly to stand erect as shown in FIG. 1 with platform 18 resting on the ground/floor (not shown) with the wheels contacting the ground/floor. Wheels 24 are mounted to frame 12 by web portions 26. A telescoping boom arm 28 is mounted to back surface 22 of frame 12 adjacent end 14. Handles 44 are mounted to frame 12 adjacent end 14 and are dimensioned and configured to permit a user to move the dolly by grasping the handle and physically moving the dolly about.

Figure 2:
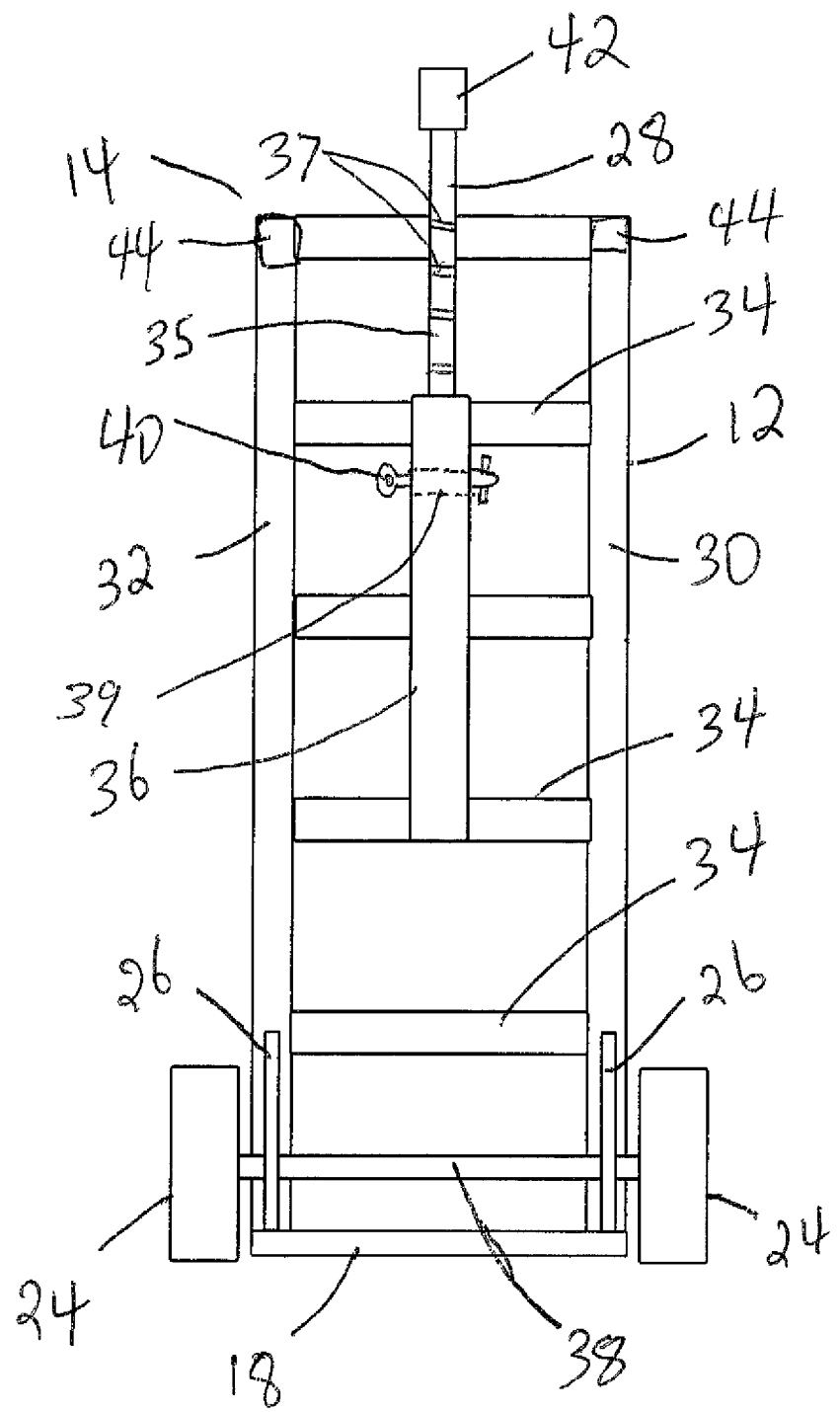
FIG. 2 is a back view of a dolly shown in FIG. 1 showing the boom portion in its extended position.

Referring now to FIG. 2, frame 12 preferably consists of rigid metal members 30 and 32 which are held parallel to each other and linked together by cross members 34. Preferably members 30 and 32 and cross members 34 consist of heavy duty steel tubing, with the cross members being welded to members 30 and 32 to keep said members rigid and parallel. Web portions 26 are preferably flat steel plates which are welded to members 32 and 32 and are configured to permit an axel 38 to couple wheels 24 to each other so that wheels 24 remain parallel at all time even under physical strain. Telescoping boom 28 preferably consists of elongated arm member 35 which is dimensioned and configured to fit within elongated tubular member 36. A trailer hitch coupling 42 is positioned securely on the end of arm 35. Tubular member 36 are Locking bolt 40 is provided to pass through both arm 35 and tube 36 so that when secured by the locking bolt, arm 35 is rigidly and immovably secured to tube 36.

Apertures 37 are formed on arm 28 along the length of the arm and each is dimensioned to receive bolt 40. Likewise, aperture 39 is formed in tubular member 36 and is configured to permit bolt 40 to pass therethrough in order to lock arm 35 to tubular member 36. Arm 35 is moved such that one of apertures 37 align with aperture 39 to permit bolt 40 to pass through both aligned apertures. Apertures 39 and 37 are oriented to be parallel to frame 12 so that bolt 40 will be positioned parallel to the back surface of frame 12. The ends of the bolt do not project towards or away from frame 12 so it is less likely to be sheared off in the even the dolly is moved against a hard surface since the entire bolt will be positioned between frame 12 and tubular member 36.

Figure 3:
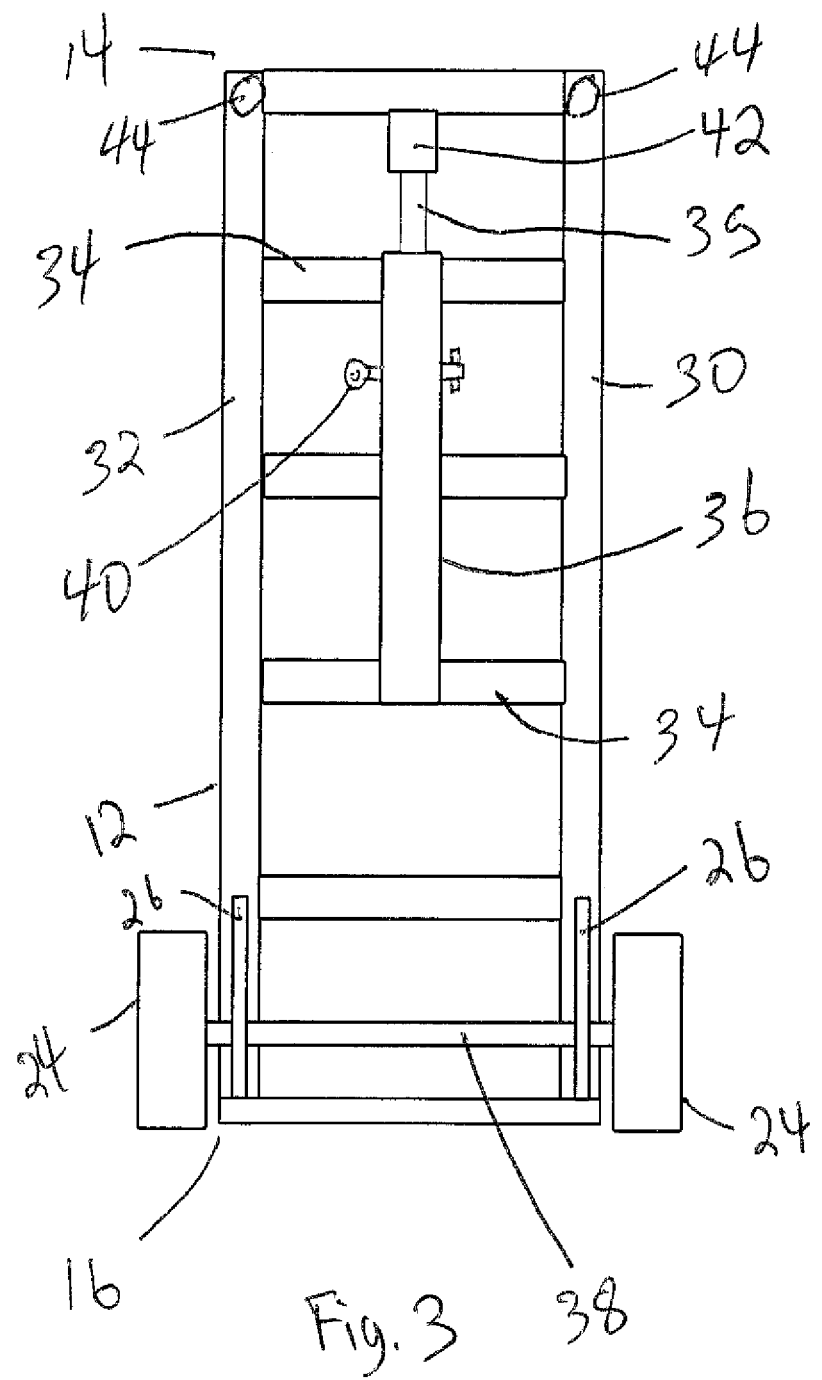
FIG. 3 is a back view of a dolly shown in FIG. 1 showing the boom portion in its retracted position.

Preferably arm 28 and tubular member 36 are dimensioned and configured such that arm 35 is held snugly within the tubular member and arm 25 is prevented from rattling within the tubular member. The position of arm 35 can be changed by simply pulling out bolt 40, sliding arm 35 into a new position and re-engaging bolt 40 when the arm is in the desired position. In this way, arm 35 is selectively movable between an extended position as shown in FIG. 2 where trailer hitch coupling 42 is positioned beyond end 14 and a retracted position as shown in FIG. 3 where trailer hitch coupling 42 is positioned between ends 14 and 16. With arm 35 in its retracted position, the user has easier and more convenient access to handles 44 and the dolly is easier to maneuver about. Tubular member 36 is rigidly welded to cross member 34 such that the tubular member is positioned exactly between and parallel to members 30 and 32. As mentioned above, arm 35 is snugly retained within tubular member 36 so that the arm and tubular member are coaxially aligned. Tubular member 36 must be positioned exactly in the middle of frame 12 equidistant from members 30 and 32 so that arm 35 and coupling 42 are exactly equidistant to wheels 24 on either side of the dolly. This is vitally important since the goal is to minimize the forces applied to arm 35 as the dolly is rolling down a street or highway. If arm 35 is not exactly parallel to wheels 24 and if the arm is not positioned exactly equidistant between wheels 24, then torsional forces will be applied to the dolly and to arm 35 which might cause the dolly to flip over. Webs 26 preferably consist of steel plates which are securely welded to members 30 and 32 and axel 38 is securely mounted to webs 26 so that wheels 24 are maintained exactly parallel and keep their position relative to arm 35 even when dolly 10 is traveling quickly and going over bumps and potholes.

Figure 4:
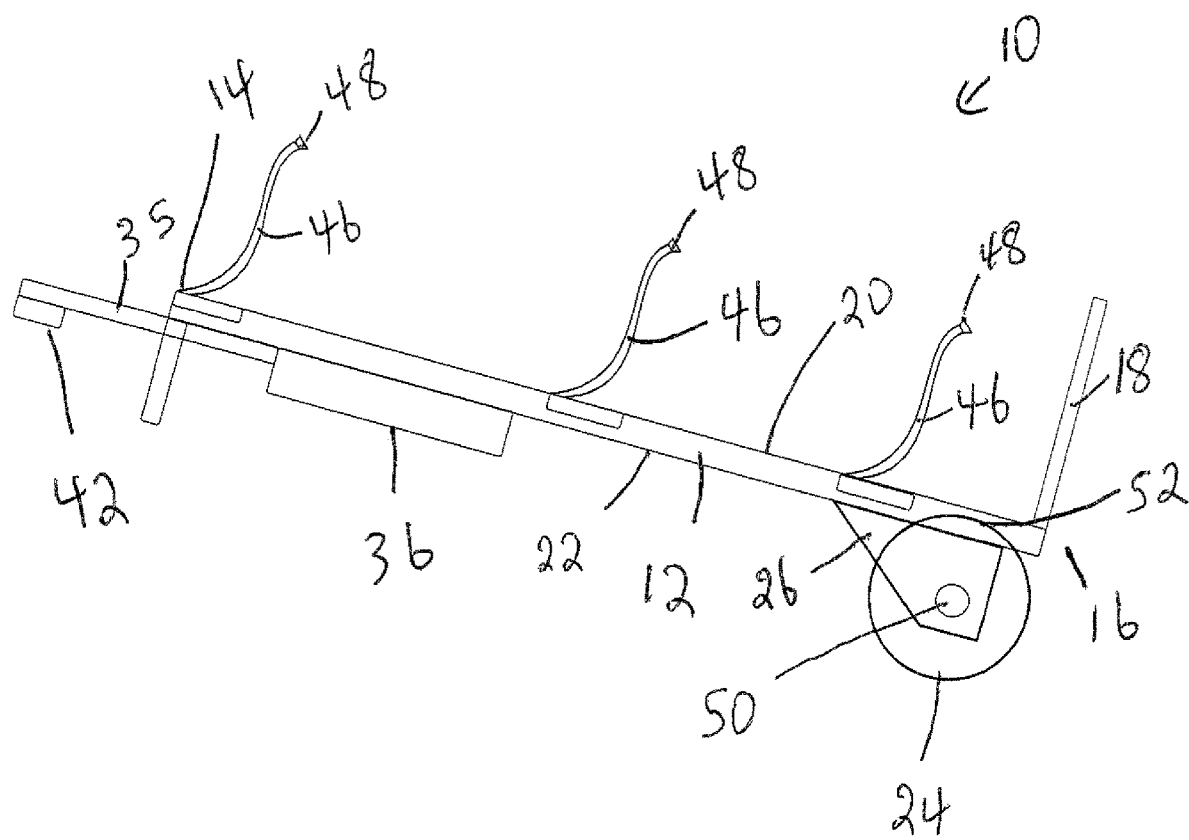
FIG. 4 is a side view of the dolly shown in FIG. 1 showing the dolly in its reclined position.
Figure 5:
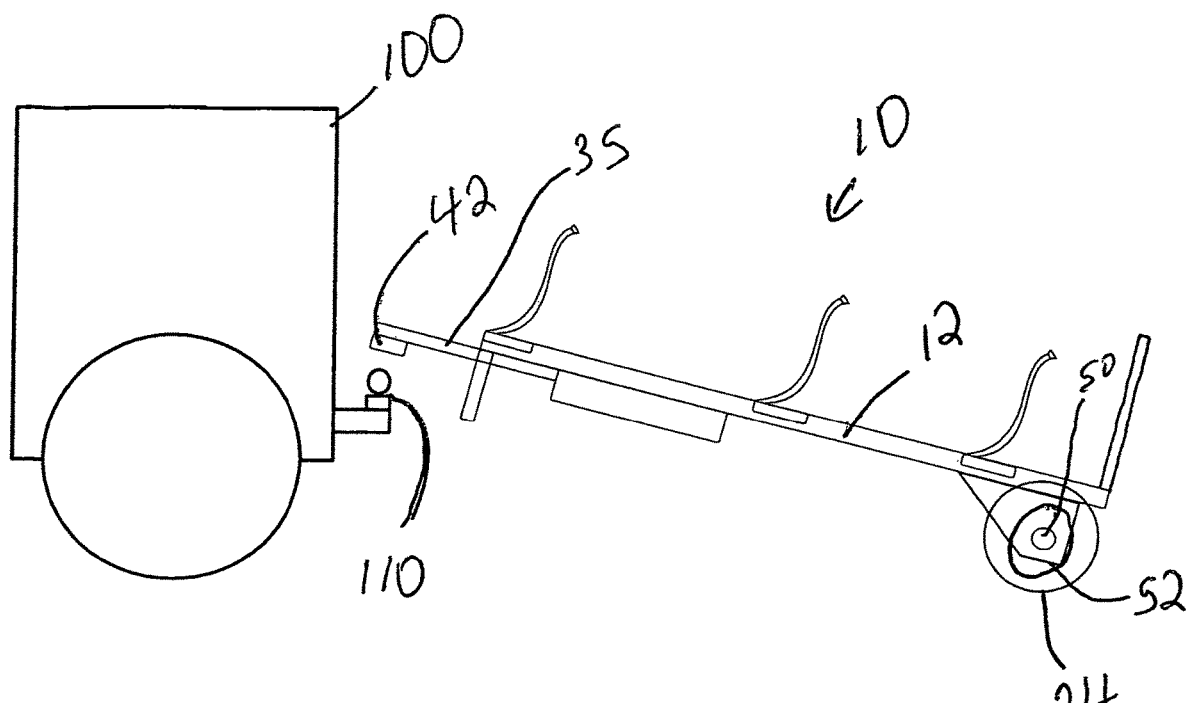
FIG. 5 is a side view of the dolly shown in FIG. 1 showing the dolly in its reclined position as attached to a vehicle.

Referring now to FIG. 4, dolly 10 can be inclined towards back surface 22 so that the dolly rests on wheels 24 and platform 18 is positioned away from the floor/ground. The object to be transported (not shown) can then be secured onto front surface 20 by means of straps 46 and buckles 48. Straps 46 may be permanently secured to frame 12, or they may simply consist of ropes, nylon straps or elastic chords which are commercially available and simply tied onto frame 12. Referring now to FIG. 5 coupling 42 is configured to be securely attached to trailer hitch 110 of vehicle 100. When inclined in the manner shown in FIG. 5, the weight of the object secured onto dolly 10 is born entirely by wheels 24 and arm 35. Trailer hitch 110 bears some of the weight of the object because it is attached to coupling 42 at the end of arm 35, but the remainder of the weight is born by wheels 24. Wheels 24 preferably consist of highway rated pneumatic tires mounted onto wheel rims 52 having hubs 50. The diameter of wheels 24 are selected such that the distance separating the outside of wheels 24 and hub 50 is as high as possible. This allows for the wheels to act as shock absorbers to permit the wheels to absorb vibrations and torsional forces applied to dolly 10 as the dolly rolls down the street or highway. Preferably the wheels will have a diameter of 12 inches or more to provide as much shock absorption as possible. The distance between hub 50 and frame 12 should be at least several inches, in particular at least about 5 inches, to ensure that there is sufficient road clearance separating rigid frame 12 at end 16 and the road onto which the wheels are riding on.

Figure 6:
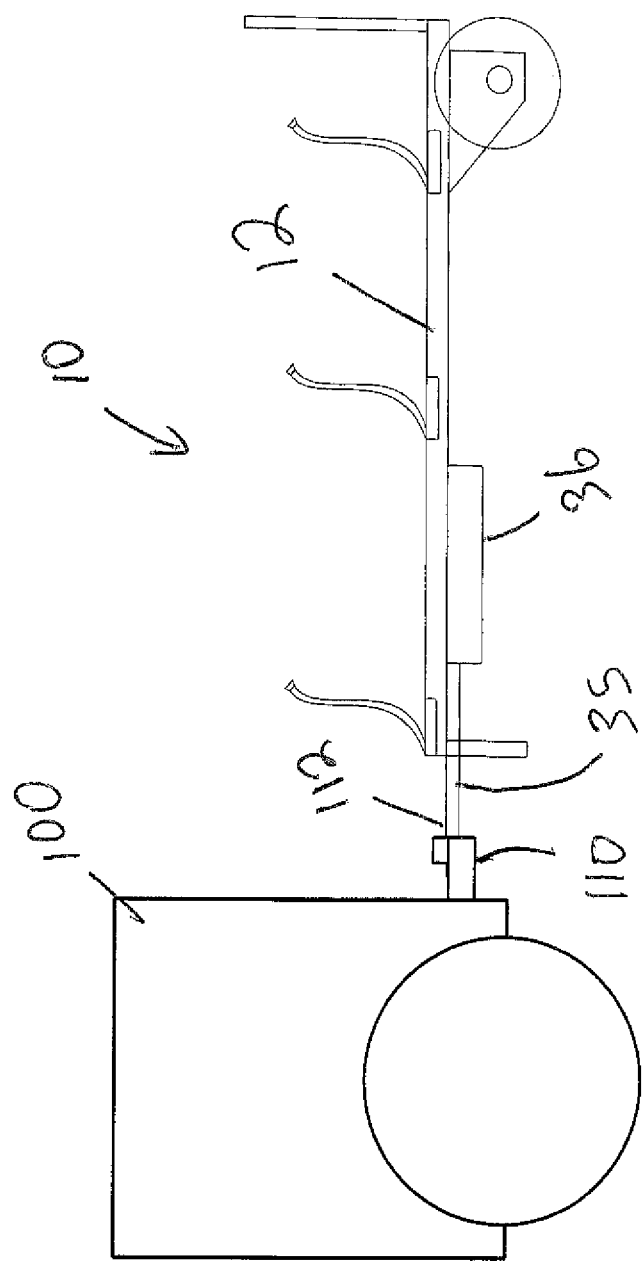
FIG. 6 is a side view of the dolly shown in FIG. 1 showing the dolly attached to a vehicle in an elevated position.

Referring now to FIG. 6, arm 35 and tubular member 36 are preferably formed to have a square or rectangular cross-sectional profile. The rectangular cross-sectional profile makes it less likely that frame 12 of dolly 10 will rotate relative to arm 35 in the event the dolly is jostled while riding on the back of vehicle 100. Trailer hitch 110 is preferably a standard trailer hitch which has a square opening formed thereon to receive a trailer arm. End 112 of arm 35 is preferably formed to closely and snugly fit within the square opening of trailer hitch 110. End 112 has a square cross-sectional profile so that when it is inserted into hitch 110, it cannot rotate relative to vehicle 100. Arm 35 and tubular member 36 are preferably made of thick and very strong square tubular steel, so that they are sufficiently strong to be suspended onto hitch 110 without breaking, twisting or bending. This permits dolly 10 to be mounted to hitch 110 such that the dolly is suspended horizontally above the road with frame 12 suspended above the road. This permits the dolly to travel with the vehicle without suffering the damage caused by excessive bumping or vibration from the road. Vehicle 100 will have a suspension system which mitigates against excessive vibration and bumping, enabling dolly 12 to ride with the vehicle while minimizing the vibration and bumping of the dolly. Of course, given the length of dolly 10 and the weight of an object mounted to dolly 10, hitch 110 must be heavy duty.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims Therefore, what is claimed is:

1. A dolly for carrying a heavy object by means of a car with a trailer hitch, the dolly comprising:

a rigid elongated frame having a width, a length defined by opposite first and second ends, a front face and a back face, and opposite left and right sides, a platform extending perpendicularly from the rigid frame on the front face at the first end;

left and right parallel pneumatic wheels positioned on the left and right sides the rigid frame, respectively and extending perpendicularly away from the rigid frame opposite the platform, each pneumatic wheel being highway rated and having a diameter of at least 12", each pneumatic wheel having a hub rotatably mounted to the rigid frame by a flange member projecting perpendicularly from the rigid frame, the flange members positioning the hubs away from the rigid frame such that the hubs are at least 5" from the back face of the rigid frame and the left and right pneumatic wheels extend at least 2" away from the left and right sides of the rigid frame, respectively;

a pair of handles positioned on the rigid frame adjacent the second end, the pair of handles projecting from the back face of the rigid frame;

a retractable boom positioned on the back face of the rigid frame equidistant from the left and right sides, the retractable boom having a distal end, a trailer hitch coupling being formed on the distal end, the retractable boom being selectively movable between a retracted position wherein the distal end is positioned between the first and second ends of the rigid frame, and an extended position wherein the distal end projects beyond the second end of the rigid frame, and a lock for releasably locking the retractable boom in its extended position such that the boom is rigidly immovable relative to the rigid frame.

2. The dolly of claim 1 further comprising a reinforcing member mounted to and extending between the flanges, the reinforcing member configured to keep the flanges parallel.

3. The dolly of claim 2 wherein the retractable boom comprises an elongated first rectangular steel member dimensioned to fit snugly within an elongated second rectangular member which is secured to the rigid frame, the elongated first member having a plurality of apertures formed thereon for receiving a lock bolt dimensioned and configured to pass through an opening passing through the second rectangular member, the apertures on the first rectangular member and the opening in the second rectangular member positioned such that the lock bolt is positioned parallel to the back side of the rigid frame when the lock bolt is threaded through the opening and one of the apertures.

4. The dolly of claim 3 wherein the first member is configured to mount to the trailer hitch such that the dolly is fully suspended and held up by the trailer hitch.

5. A dolly for carrying a heavy object over a highway by means of a car with a trailer hitch, the dolly comprising:

a rigid elongated frame having a width, a length defined by opposite first and second ends, a front face and a back face, and opposite left and right sides, a platform extending perpendicularly from the rigid frame on the front face at the first end;

left and right parallel pneumatic wheels positioned on the left and right sides the rigid frame, respectively and extending perpendicularly away from the rigid frame opposite the platform, each pneumatic wheel is rated for use on the highway, each pneumatic wheel having a hub rotatably mounted to the rigid frame by a flange member projecting perpendicularly from the rigid frame, the flange members positioning the hubs away from the back face of the rigid frame and the left and right pneumatic wheels extend away from the left and right sides of the rigid frame, respectively;

a pair of handles positioned on the rigid frame adjacent the second end, the pair of handles projecting from the back face of the rigid frame;

a retractable boom positioned on the back face of the rigid frame equidistant from the left and right sides, the retractable boom having a distal end, a trailer hitch coupling being formed on the distal end, the retractable boom being selectively movable between a retracted position wherein the distal end is positioned between the first and second ends of the rigid frame, and an extended position wherein the distal end projects beyond the second end of the rigid frame, and a lock for releasably locking the retractable boom in its extended position such that the boom is rigidly immovable relative to the rigid frame.

6. The dolly of claim 5 further comprising a reinforcing member mounted to and extending between the flanges, the reinforcing member configured to keep the flanges parallel.

7. The dolly of claim 6 wherein the retractable boom comprises an elongated first rectangular steel member dimensioned to fit snugly within an elongated second rectangular member which is secured to the rigid frame, the elongated first member having a plurality of apertures formed thereon for receiving a lock bolt dimensioned and configured to pass through an opening passing through the second rectangular member, the apertures on the first rectangular member and the opening in the second rectangular member positioned such that the lock bolt is positioned parallel to the back side of the rigid frame when the lock bolt is threaded through the opening and one of the apertures.

8. The dolly of claim 7 wherein the first member is configured to mount to the trailer hitch such that the dolly is fully suspended and held up by the trailer hitch.

* * * * *